United States Patent [19]
Frantz et al.

[11] Patent Number: 5,557,557
[45] Date of Patent: Sep. 17, 1996

[54] PROCESSOR POWER PROFILER

[75] Inventors: Gene A. Frantz, Missouri City, Tex.; Subramaniyan Subuvenkat, Bangalore, Ind.; Jonathan Bradley, Houston; James A. Larimer, Missouri City, both of Tex.

[73] Assignee: Texas Instruments Incorporated, Dallas, Tex.

[21] Appl. No.: 317,957

[22] Filed: Oct. 4, 1994

[51] Int. Cl.⁶ .................................................. G01R 11/00
[52] U.S. Cl. .................... 364/578; 364/413; 364/490; 364/551.01; 364/707; 395/500
[58] Field of Search .................................. 364/483, 488, 364/489, 490, 498, 578, 550, 551.01, 281, 281.3, 707, 495; 395/500, 750; 371/18, 22.1

[56] References Cited

U.S. PATENT DOCUMENTS 5,383,137  1/1995  Burch ........................ 364/578

OTHER PUBLICATIONS

Bass et al., Design Methodologies for the PA7100LC Microprocessor, Apr. 1995, all pages.
Conte et al., A Techniques to Determine Power–Efficient H.P. Superscalar Processors, 1995, all pages.

Bradley, Jon; *Calculations of TMS320C5x Power Dissipation Application Report*, Texas Instruments, Digital Signal Processing Products–Semiconductor Group, 1993, pp. 1–30.

Bradley, Jon, and Frantz, Gene; DSP *Microprocessor Power Management: A Novel Approach*, Texas Instruments, Houston, Texas, pp. 1–8. Oct. 4, 1994 speech based upon same.

*Primary Examiner*—Emanuel T. Voeltz
*Assistant Examiner*—Craig Steven Miller
*Attorney, Agent, or Firm*—C. Alan McClure; James C. Kesterson; Richard L. Donaldson

[57] ABSTRACT

A method for determining the energy consumption of a processor when executing a program is provided. The method initially selects the processor which will execute the program and then creates a model of energy used by said processor as a function of a plurality of instructions operable by said processor. The program whose energy consumption is to be determined is then executed using the energy model to determine the energy consumption of the program on the processor.

10 Claims, 1 Drawing Sheet

PROCESSOR POWER PROFILER

TECHNICAL FIELD OF THE INVENTION

The present invention relates to the field of power use by electronic circuitry, and more particularly, to profiling power use by a processor, including microprocessors and microcontrollers.

BACKGROUND OF THE INVENTION

Today's microcontrollers and microprocessors are becoming more and more complicated. However, as the cost and size of these devices are reduced and performance increased they have been increasingly used in electronic devices where portability is a requirement. This has resulted in the need to closely monitor and control power consumption for such portable devices. As the size of the portable devices continues to decrease and the functions performed by the ever smaller devices are increasing, many different techniques have been implemented or tried to minimize power use by such portable devices. Such techniques include turning off portions of the device when not in use, slowing down clocks when applications allow for reduced computing power, or similar techniques. However, these known techniques are generally directed to system level power management for hardware components of the portable devices.

However, there are still unmet needs for additional ways to reduce the power consumed by electronic devices employing microprocessors and microcontrollers, especially portable devices.

SUMMARY OF THE INVENTION

According to one aspect of the present invention, a power profiler for microprocessors and microcontrollers is provided. In a presently preferred embodiment, a method for determining the energy consumption of a processor when executing a program comprises, selecting the processor which will execute the program, creating a model of energy used by the processor as a function of a plurality of instructions operable by the processor, and determining the energy consumption of the program by executing the program whose energy consumption is to be measured using the energy model.

Preferably, the power profiler of the present invention is a simulator program for a microprocessor or microcontroller that includes a model of power consumption by that microprocessor or microcontroller based upon its instruction set.

The present invention provides an improved simulator for a microprocessor or microcontroller.

The present invention also provides a system for reduction of power of a program by providing the ability to identify areas of the program which require high and low amounts of power.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION OF THE INVENTION

Figure 1:
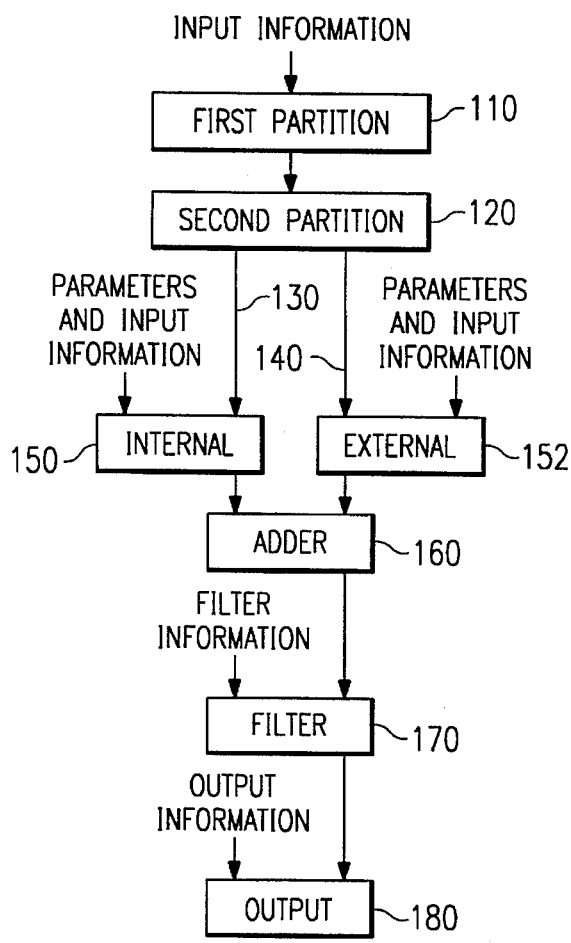
FIG. 1 depicts a simplified flow diagram of the steps performed by a presently preferred embodiment of the power profiler of the present invention.

The present invention provides a power profiler for microprocessors and microcontrollers. However, before discussing the details of the power profiler of the present invention a brief review of current consumption by processors is provided.

Most present day processors use complementary metal oxide semiconductors (CMOS); ideally a CMOS device draws a current only when switching state and thus offers the best potential for a fully static device that exhibits zero current drain in a standby or non-switching mode. For CMOS processors the internal gates swing completely from one supply voltage to the other; that is, the voltage swing is typically from the power supply voltage $V_{dd}$ to ground, or from ground to $V_{dd}$.

The voltage change on the gate capacitance requires a charge transfer resulting in power consumption. Multiplying the gate capacitance times the voltage swing provides the resulting change in gate charge in coulombs; alternatively, the current required to make the change may be obtained by multiplying the voltage swing times the gate's capacitance times the frequency of the swing. If the total number of gates switching at a frequency is known, an effective total capacitance may used to calculate current for a given $V_{dd}$ voltage and frequency. This current is then multiplied by the $V_{dd}$ voltage to obtain the power used.

For a microprocessor or microcontroller, this total capacitance includes both internal and external capacitances. Bipolar devices, pull-up resistors and other types of devices consume DC power that adds a constant, or possibly changing, power loss that is typically data dependent rather than frequency dependent. Further, using pull-ups or pull-downs on unused inputs avoids floating gates, by avoiding CMOS gates biased in the linear region, where they may also unnecessarily consume current.

Therefore, the current or power required is the average of the sum of all the components of required current or power for each independent element switching. The more densely concentrated these are over time, the greater the average current; that is, the higher the switching rate the higher the current. Similarly, the larger the capacitance being charged during switching, the more current that will be required.

Thus, for a microprocessor or microcontroller, power consumption is related to at least the operating frequency, the supply voltage, device operating temperature and output loads. In general, this power consumption may be conveniently categorized into multiple basic components, such as, for example, but not limited to, quiescent, internal operations, internal bus (address, data, program) operations and external bus (address, data, program) operations (which includes any external communication or other types of ports). Each of these four components may be further subdivided, categorized or analyzed; for example, duty cycle may impact all four, while the number of buses used, use of wait states, cache usage, and data values may impact the last three.

From the foregoing discussion, it is clear that for a given architecture of a microprocessor or microcontroller, that microprocessor or microcontroller dissipates varying amounts of power depending upon which instructions are being executed and depending upon what data or buses are being utilized. There are normally many ways to program a microprocessor or microcontroller to perform the same function, or an equivalent function. However, it is not clear how to write a minimum or minimal power version of a program for providing a given function or application.

The typical measure of relative power consumption of a microprocessor or microcontroller is mN/MIPS. If this expression is written out it is seen that, $$mA/MIPS = \{10^{-3} \text{ amps}\}/\{10^6 \text{ instructions/second}\} \quad (1)$$
$$= 10^{-9} \text{ (amp-sec)/instruction} \quad (2)$$

Further, if the substitution of coulombs is made for (amp-sec) in equation (2), the following result is obtained, $$mN/MIPS = 10^{-9} \text{ coulombs/instruction} \quad (3)$$

Further, since a joule of energy is defined as an amp-sec of charge flowing through one ohm of resistance, the mN/MIPS expression may be equated to the amount of energy used for an instruction or sequence of instructions as a function of the charge passing through the resistance presented by the processor or controller. Therefore, when the term mN/MIPS is used, reference is actually being made to the amount of energy required to execute an instruction or sequence of instructions, which is a variable or quantity that is time independent.

Further, since different instructions require different amounts of energy to execute, the power requirements for different programs may vary widely due to many factors which relate primarily to architecture and coding. Some of these factors include internal device functional block interconnection as well as density of functional operation coding such as multiplies, accumulates, branches, repeats, idles, powerdowns, etc. All of these factors have a significant effect on the relative power consumption of different programs.

One simple example is a wait loop in a sequence of code in a program. For a Texas Instruments TMS320C5x family of DSP microprocessors, a wait loop may be implemented with a branch to self instruction, which requires about 45 mA (depending upon the addresses involved), or with an IDLE instruction which requires about 10 mA, or with an IDLE2 instruction which requires about 3 mA. A further example is a VSELP speech coding program using two different code implementations. This program performs a predetermined set of functions for a specific set of inputs and yields a specific result. One version of the code requires about 47 mA while the another version requires about 51 mA; although there is only about a ten percent difference between the two, this can be quite significant in today's power sensitive battery operated applications.

Accordingly, when implementing power sensitive designs, early evaluation of power requirements is often critical to successful implementation of the design. With sufficient knowledge of the power performance of a given device, a power profiler program may be written which will evaluate the power required by an arbitrary coding of a program and provide this information as a power profile. In the development of any design, the evaluation of its performance before actual fabrication is usually critical for a timely implementation of the design; simulators and emulators are ways to achieve this early device performance simulation or evaluation. The power profiler may operate as an adjunct to a device simulator or emulator, since it uses information about the device operations obtainable from the simulator or emulator regarding processor state and program execution. The profiler analyzes this information and, along with knowledge of the device's power characteristics, derives information about power usage during execution of a program which can be displayed and viewed. This information can then be manipulated and further analyzed in a variety of manners.

The power profiler receives inputs related to the operation of a target processor and its environment, and uses this information to make detailed evaluations of current and/or power over a period of time. The calculated or projected power data may then be manipulated in a variety of ways, including for example, but not limited to, averaging over several instructions or a fixed time window followed by displaying the results in a graphical or tabular form. This power profile provides the capability to modify a program being observed in a way to minimize power usage in a given system environment.

The power profiler receives inputs regarding the processing operation and environment from several sources. First, the profiler receives input information about the program executing on the processor. This input comes in the form of a sequence of data values representing the instruction opcodes and data which make up the program executing on the processor; that is, data values and different categories of instruction sequences are provided by the device simulation or simulator. The inputs also contain information representing contents of external memory and any registers which effect processor operation. This information is contained as values within the stream of data which represents the contents of various buses and internal registers within the device over the course of a given period of device operation. The information is provided as tables of data present on the various buses or in the registers of the device. This information contains up-to-date information about register contents as program execution proceeds. These inputs are provided from the simulations of the program execution on the device.

The profiler also receives inputs regarding the environment of the target device. This information consists of descriptions of the external conditions under which the device is operating. This information is input to the profiler as parameter specifications provided by a user and consists of parameters such as, for example, but not limited to, AC and DC bus loading, clock frequencies and modes of operation.

The profiler then relates this information to device operations being performed, and finally to levels of current or power required for those operations. The profiler monitors and accounts for the effects of such things as repeated instructions, operand addressing modes, addressing modes, etc. Along with this information, information about data values, their switching and its effects on device current or power are also included in the total current or power calculations. The effects of external bus capacitance and DC loading are also calculated and added to the appropriate current or power components.

The profiler generates several types of internal results. Primarily, the results are values of current (or power) for each current component type of the device, of which there may be any number. These results may be presented in graphical, tabular or any other convenient display format. The results of each component type may be presented either separately or combined with other types to represent any combination of device component types. The current (or power) components are related to the instruction executing on the device allowing observation of current components during each section of code. Nominally, a predetermined amount of averaging of 5–10 instruction cycles is provided to duplicate the filtering effects of internal device capacitance and external power supply filter capacitance and system inductance. The amount of averaging may be predetermined or preselected.

Once the power requirements of a program are understood with the help of the power profiler, power reduction techniques may be employed to optimize power usage of the program. Such power reduction techniques are for example, but not limited to, substitution of lower power instructions or sequences for higher power ones, reduction of parallelism of operations whenever possible, using register variables instead of those located in memory, and using on-chip rather than off-chip memory. That is, a second power optimizing program may be written that restructures a program's coding in a manner to minimize its power consumption during execution, in much the same way as an optimizing C compiler.

Referring now to FIG. 1 there may be seen a simplified flow diagram of the steps performed by the power profiler of the present invention. The initial step 110 of the profiler is to determine which major type of instruction is being utilized by the program, based upon input information. That is, the permissible instructions used by the processor are partitioned 110 into several different groups. These groupings may be made by examining and identifying the predominant types of device activities involved during execution of the various instructions.

For example, using the Texas Instruments TMS320C5x DSP microprocessor the instructions may be grouped into internal CPU activity currents, memory usage currents, clock generation circuitry currents, output currents (which includes address, data and control signals), parallel bus currents, other output currents and TTL and DC load currents. Internal current requirements start at about 3 mA for an IDLE2 instruction, with a system clock of 20 MHz; when the device input clock is turned off while in IDLE2, the DSP enters the lowest current standby mode. The IDLE instruction suspends CPU activity but retains clock signal for internal device logic and peripherals and requires about 10 mA. To fetch and execute instructions from on-chip memory requires about 42 mA, depending upon the data values. For the simplest instructions like a NOP and simple internal operations, using the repeat function reduces the current but only for the duration of the repeated instruction. The current is reduced because the repeat function does not refetch the instruction.

However, for more current intensive operations such as a MACD instruction, current is increased when using a repeat because the execution of the instruction requires more current than its fetching and decoding, contrary to the case for the simpler instructions. The rough break-even point for C5x instructions in the repeated and not-repeated modes is when the ALU is involved. When the device's multiplier is involved there is an additional increase in current, as there is when additions are performed in the accumulator in parallel with multiplications. When multiplications are combined with additions, concentrated memory usage, and the DMOV operation with rapidly varying data values using the MACD instruction, current requirements are increased even more.

In addition to instruction execution and processing operations within the CPU, accessing on- and off-chip memory for bulk data transfers to and from internal memory may generate considerable current requirements. The major portion of the memory arrays are inactive even during a memory access and it is the buses being used for a memory access which require significant amounts of current. There are four main internal buses on the TMS320C5x; there are data and address buses for both program and data memory spaces. CPU activity and internal memory and bus usage are closely related because all program activity (except repeats) utilize the program data and address buses, while data operations utilize the data address and data buses and sometimes the program buses. For bulk data transfers using two of the internal buses heavily, such as writing rapidly changing data to off-chip locations with rapidly varying addresses, the current requirements are nearly maximum. The choice of clock generation options also effects current requirements.

For output current requirements, similar analysis may be performed resulting in components due to address bus outputs, data bus outputs, and control signal outputs. In addition, current components due to the external parallel bus interface must also be considered. Other output signals, such as CLKOUT1, $\overline{IAQ}$ and other fast switching control signals may also generate current components that are to be considered. If the device outputs experience TTL or other predominantly DC loads, their current components must also be included.

As can be seen from this quick review of some of the current components and instructions for the TMS320C5x, the initial instruction partition may not be an easy task. However, for the C5x, the first four bits of the opcode normally identify the major types of operations in sufficient detail and serve as the first partitioning 110 of the code.

Following the first partition 110, a second partition 120 is made that is keyed to the first partition. That is, for certain groups of instructions a second single or multi-bit position grouping is required to accurately represent the instruction's current component. For some first partition groups no additional partition is required because the first four bits of the opcode uniquely identify the instruction so that its current component may be calculated or read from a value or table stored in a memory.

After the second partition 120 the instructions are broken into parallel internal 130 and external 140 current component calculation paths. The internal and/or external current components for each instruction are calculated or read from a table, based upon information from the second partition step 120 and parameters and other input information, and then summed together in an adder 160 to provide the total current component for that instruction. The sum of current components 160 may then be filtered or smoothed 170, based upon filter information, by a predetermined or preselected amount to provide a total device current consistent with the measured current supplied to the device. The predetermined amount of filtering is to model the supply's capacitive and inductive loads, while the preselected amount of filtering provides variable amounts of filtering based upon user desires.

After the current components are smoothed, they may be output 180, based upon output information, in a manner to provide maximum understanding and flexibility to a user. Typically, they will be displayed on a screen associated with the emulator or simulator being used for the device. The display includes, but is not limited to a configuration window for parameters, a program window for the code being run, and a power window with the current or power components in a graphical or tabular format, or any other convenient display form. A moveable cursor highlighting a line of code would correspond to a cursor highlighting the current component for that line of code. These two cursors would be coordinated to move together as one or the other is moved by the user.

Figure 2:
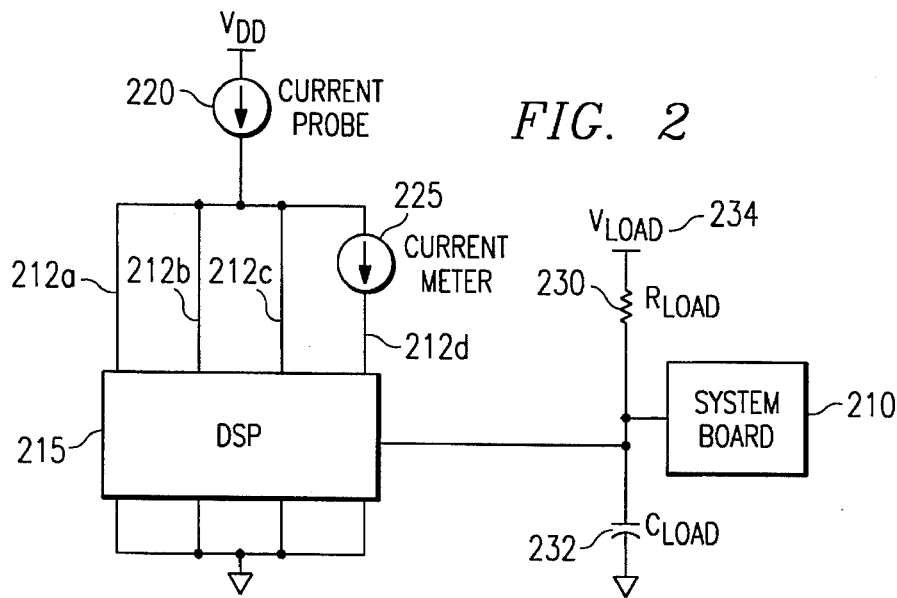
FIG. 2 depicts a functional block diagram of a system employed to measure the power supply current and voltage for a processor.

FIG. 2 depicts a functional block diagram of a system employed to measure the power supply current for a given supply voltage for a processor. More particularly, FIG. 2 depicts a special system board 210 arrangement employed to measure the actual current for each of the four power supply pins 212a–212d of a TMS320C5x DSP; the board allows power supply connections to the device to be isolated, so that current measurements may be made on each of the four groups of power pins separately or together. The DSP is depicted as a block 215, and a current probe 220 and an inline digital current meter 225 are also depicted. The inline digital current meter 225 is used on the internal power supply connection for improved accuracy and correlation of results with the current probe 220. In addition, an external load voltage 234, resistance 230 and capacitance 232 are provided for appropriate outputs of the DSP 215. This test setup allows variations in DC load resistance 230, load capacitance 232, and load voltages 234 to enable measurements to be made over a wide range of system conditions. A similar arrangement may be employed for other processors.

Figure 3:
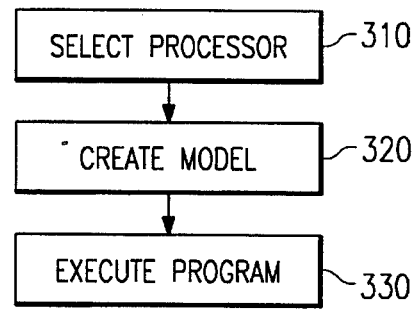
FIG. 3 depicts a flow chart of the main steps of a method for practicing the present invention.

Referring now to FIG. 3 there may be seen a flow chart of the main steps of a method for practicing the present invention. More particularly, it may be seen from FIG. 3 that the initial step 310 is to select the processor on which the program (whose power consumption is to be determined) is to be run. "Processor" is used in its generic sense and includes microprocessors and microcontrollers. Once the processor has been selected, a model of power usage for that processor is created 320 using information about the actual power consumption of instructions when executing on that processor or calculated power consumption based on simulators, emulators, or other device characterizations. The model 320 generally partitions the various instructions into groups related to usage of the various components of the processor by the instruction. The program is then executed 330 using the model to determine the power consumption of the program.

In summary, a method for determining energy consumption of a processor when executing a program, comprises, selecting a processor, creating a model of energy used by said processor as a function of a plurality of instructions operable by said processor, and executing said program whose energy consumption is to be measured using said energy model to determine said energy consumption of said program.

Following the determination of energy consumption by the program, it may be analyzed and optimized to minimize the energy utilized by the program on the processor. This may be accomplished by replacing high power instructions with lower power instructions, more efficiently storing data or code to minimize address changes, using register variables, reducing parallelism of operations, etc.

Although the foregoing discussion has generally been directed to current components, the invention is not so limited. The prior discussions could also be made for energy or energy-related components in any convenient units, such as power (milliwatts or joules) or charge (coulombs), but have not been for the sake of clarity. Similarly, the discussion of mN/MIPS includes any convenient current or power instead of mA and any convenient measure of instructions, such as for example, but not limited to, MOPS or MFLOPS, instead of MIPS.

The present invention is capable of being implemented in software, hardware, or combinations of hardware and software. Although the present invention and its advantages have been described in detail, it should be understood that various changes, substitutions and alterations may be made herein without department from the spirit and scope of the invention, as defined in the appended claims.

What is claimed is:

1. A method for determining energy consumption of a processor when executing a program, comprising:
    selecting a processor,
    creating a model of said processor for said processor's energy usage based upon the instruction set of said processor,
    executing said program whose energy consumption is to be measured using said model to determine said energy consumption of said program, and
    outputting said determined energy consumption of said program for said processor.

2. The method of claim 1, wherein said creating a model step includes measuring supply voltage and current for said processor as a function of said instructions during execution of each of said plurality of instructions operable by said processor.

3. The method of claim 1, wherein said creating a model step includes determining energy usage for said processor as a function of said instructions during execution of each of said plurality of instructions operable by said processor by using a design simulation of said processor.

4. The method of claim 1, wherein said creating a model step includes determining energy usage for said processor as a function of said instructions during execution of each of said plurality of instructions operable by said processor by using a device characterization of said processor.

5. The method of claim 1, wherein said creating a model step includes attaching said energy model to a simulator for said processor.

6. The method of claim 1, wherein said creating a model step includes attaching said energy model to an emulator for said processor.

7. The method of claim 1, further comprising, displaying said determined energy consumption of said program for said processor.

8. The method of claim 1 further comprising, minimizing said determined energy consumption of said program for said processor.

9. A method for determining power consumption of a processor when executing a program, comprising:
    selecting a processor,
    measuring power consumption of said processor during execution of each of a plurality of instructions operable by said processor,
    creating a model of said processor for said processor's power usage based upon the instruction set of said processor,
    attaching said model to a simulator for said processor,
    executing said program whose power consumption is to be measured in said simulator,
    determining said power consumption of said program using said model, and
    outputting said determined power consumption of said program for said processor.

10. A method for determining power consumption of a processor when executing a program, comprising:
    selecting a processor,
    measuring supply voltage and current for said processor during execution of each of a plurality of instructions operable by said processor, creating a model of said processor for said processor's current usage based upon the instruction set of said processor, attaching said model to a simulator for said processor, executing said program whose power consumption is to be measured in said simulator, determining said power consumption of said program using said model, and outputting said determined power consumption of said program for said processor.

* * * * *